(12) United States Patent
Kim et al.

(10) Patent No.: US 11,543,060 B2
(45) Date of Patent: Jan. 3, 2023

(54) PIPE-FITTING DEVICE FOR CONNECTING PIPES HAVING DIFFERENT DIAMETERS

(71) Applicant: Brian B. Kim, Flower Mound, TX (US)

(72) Inventors: Jae Gon Kim, Yangsan-Si (KR); Byong Hwan Shin, Busan (KR)

(73) Assignee: Brian Kim

( * ) Notice: Subject to any disclaimer, the term of this patent is extended or adjusted under 35 U.S.C. 154(b) by 268 days.

(21) Appl. No.: 16/175,203

(22) Filed: Oct. 30, 2018

(65) Prior Publication Data

US 2019/0309883 A1  Oct. 10, 2019

(30) Foreign Application Priority Data

Apr. 6, 2018 (KR) .................. 10-2018-0040597

(51) Int. Cl.
*F16L 19/04* (2006.01)
*F16L 25/14* (2006.01)

(52) U.S. Cl.
CPC ............. *F16L 25/14* (2013.01); *F16L 19/041* (2013.01); *F16L 19/046* (2013.01)

(58) Field of Classification Search
CPC ......... F16L 19/06; F16L 19/061; F16L 19/08; F16L 19/10
USPC ....................... 285/92, 342, 343, 23, 915, 12
See application file for complete search history.

(56) References Cited

U.S. PATENT DOCUMENTS

| | | | | |
|---|---|---|---|---|
| 1,259,833 A | * | 3/1918 | Burns | F16L 21/005 285/294.2 |
| 1,665,346 A | * | 4/1928 | Clarke | F16L 19/061 285/148.23 |
| 2,179,127 A | * | 11/1939 | Lauer | F16L 19/10 285/341 |
| 2,394,351 A | * | 2/1946 | Wurzburger | F16L 19/12 285/341 |
| 2,437,632 A | * | 3/1948 | Wolfram | F16L 19/08 285/342 |
| 2,474,319 A | * | 6/1949 | Muller | F16L 19/086 285/343 |
| 2,478,149 A | * | 8/1949 | Wolfram | F16L 19/08 285/342 |

(Continued)

FOREIGN PATENT DOCUMENTS

| | | | | |
|---|---|---|---|---|
| FR | 1211920 A | * | 3/1960 | ............ F16L 19/10 |
| FR | 1550455 A | * | 12/1968 | ............ F16L 19/065 |

(Continued)

*Primary Examiner* — David Bochna
(74) *Attorney, Agent, or Firm* — Sul Lee

(57) ABSTRACT

A pipe-fitting device capable of easily connecting pipes having different diameters includes a fitting body and a pair of fixing nuts. The fitting body includes a first channel portion having a first inner diameter formed in a first inner side of the fitting body, a second channel portion having a second inner diameter formed in a second inner side of the fitting body, the second inner diameter being smaller than the first inner diameter such that a step is formed inside the fitting body at the boundary between the first channel portion and the second channel portion. Each fixing nut is rotatably coupled to a corresponding open end of the fitting body and configured to fix the corresponding one of the first pipe and the second pipe through rotational tightening.

4 Claims, 6 Drawing Sheets

(56) References Cited

U.S. PATENT DOCUMENTS

| | | | | |
|---|---|---|---|---|
| 2,522,785 A * | 9/1950 | Hanson | F16L 19/10 | 285/341 |
| 3,471,181 A * | 10/1969 | Fuentes | F16L 19/10 | 285/341 |
| 3,486,775 A * | 12/1969 | Callahan, Jr. | F16L 19/061 | 285/348 |
| 4,545,604 A * | 10/1985 | Braathen | F16L 25/14 | 285/12 |
| 5,308,122 A * | 5/1994 | Crawford | F16L 19/065 | 285/332.4 |
| 5,466,019 A * | 11/1995 | Komolrochanaporn | F16L 19/12 | 285/339 |
| 5,531,485 A * | 7/1996 | House | E02D 29/12 | 285/915 |
| 5,908,211 A * | 6/1999 | Blackwell | F16L 55/17 | 285/294.2 |
| 6,488,318 B1 * | 12/2002 | Shim | F16L 19/086 | 285/322 |
| 6,702,336 B1 * | 3/2004 | Chelchowski | F16L 19/086 | 285/245 |
| 9,897,238 B2 * | 2/2018 | Peirce | F16L 19/086 | |
| 10,100,952 B2 * | 10/2018 | Conrad | F16L 47/02 | |
| 2003/0090104 A1 * | 5/2003 | Woodward | F16L 33/08 | 285/915 |
| 2018/0283586 A1 * | 10/2018 | Larson | F16L 19/12 | |
| 2020/0240556 A1 * | 7/2020 | Williams | F16L 19/10 | |

FOREIGN PATENT DOCUMENTS

| | | | | |
|---|---|---|---|---|
| GB | 760290 A | * | 10/1956 | F16L 19/08 |
| GB | 836002 A | * | 6/1960 | F16L 19/06 |
| GB | 1146673 A | * | 3/1969 | F16L 19/10 |
| GB | 2007791 A | * | 5/1979 | F16L 19/061 |

\* cited by examiner

[Fig 1]
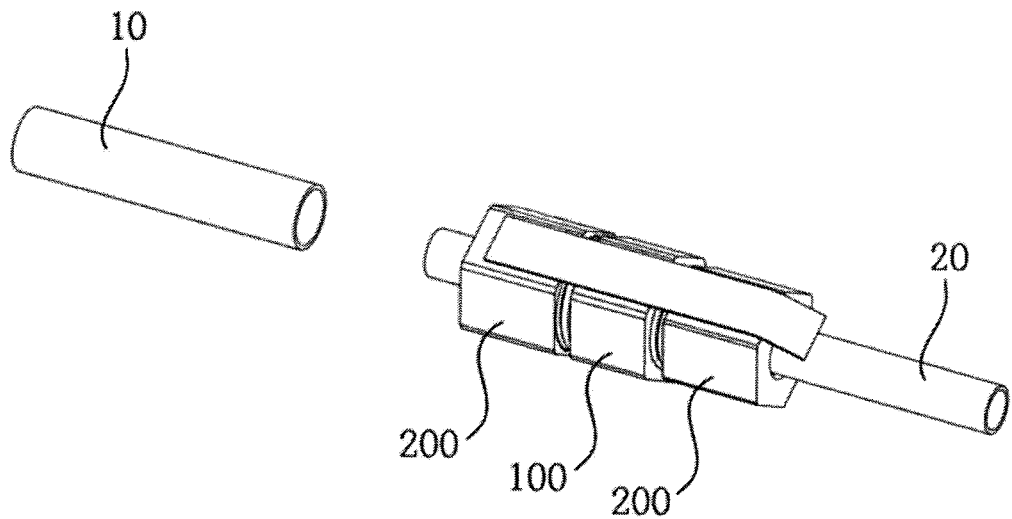
[Fig 2]
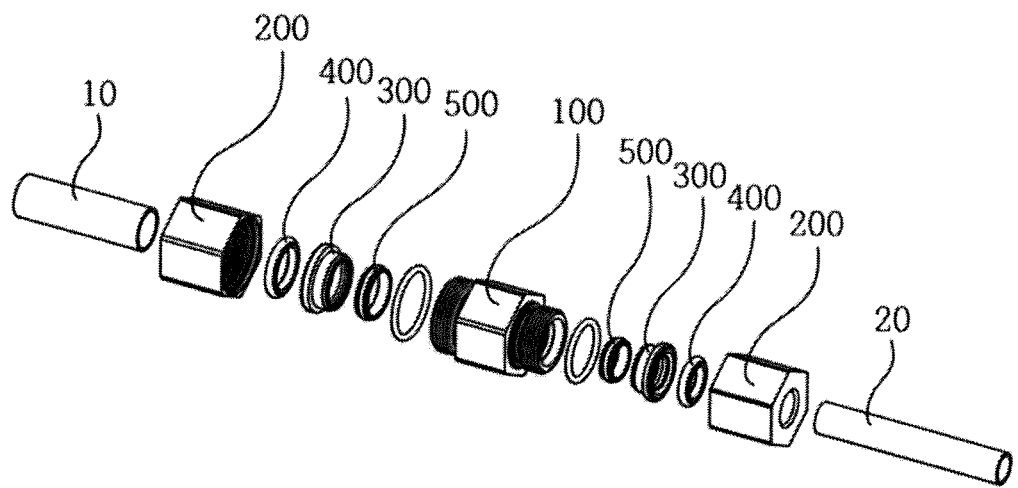

[Fig 3]
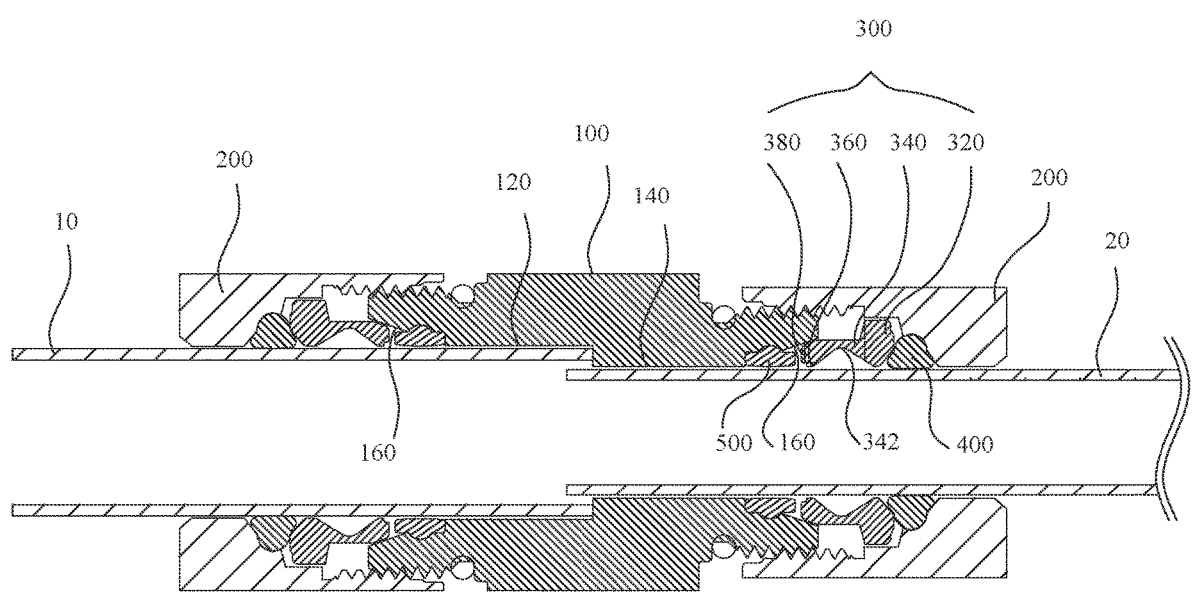

[Fig 4]
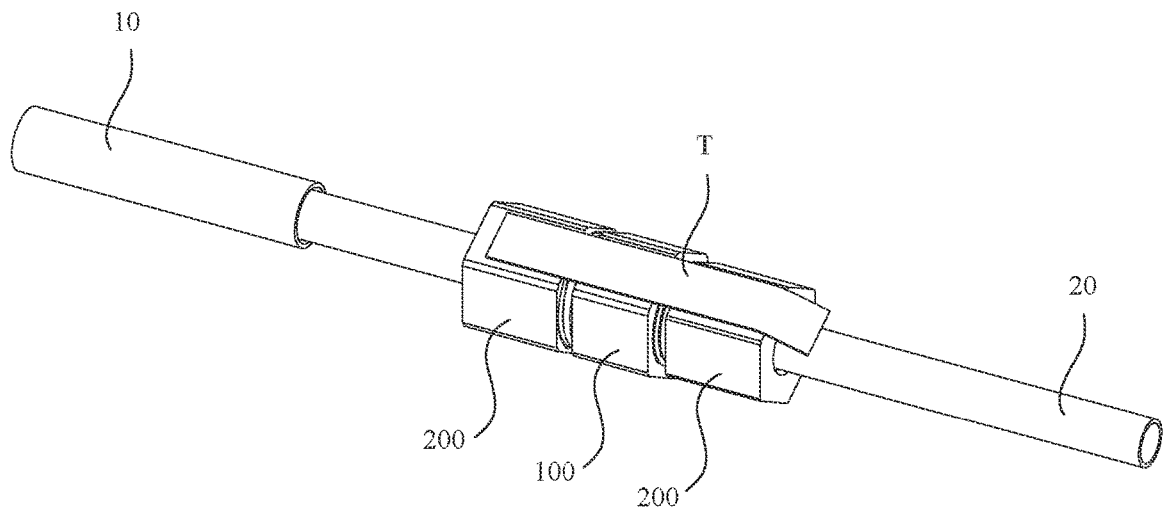
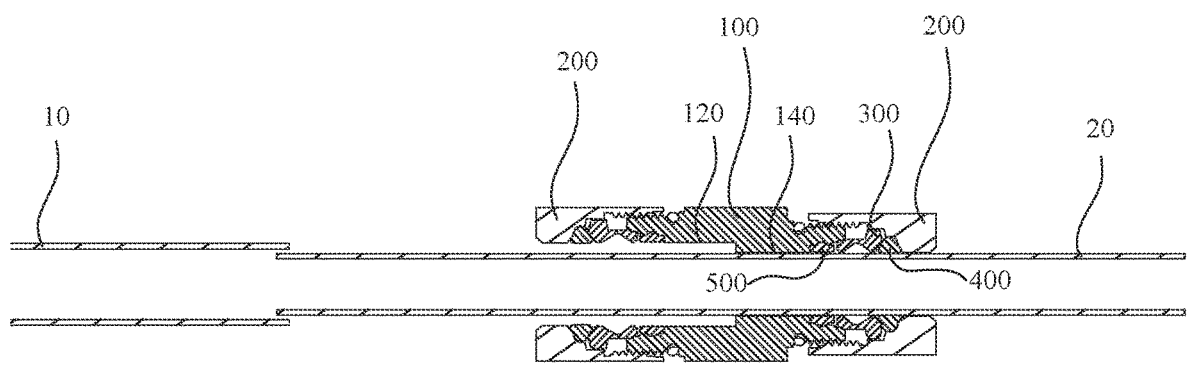

[Fig 5]
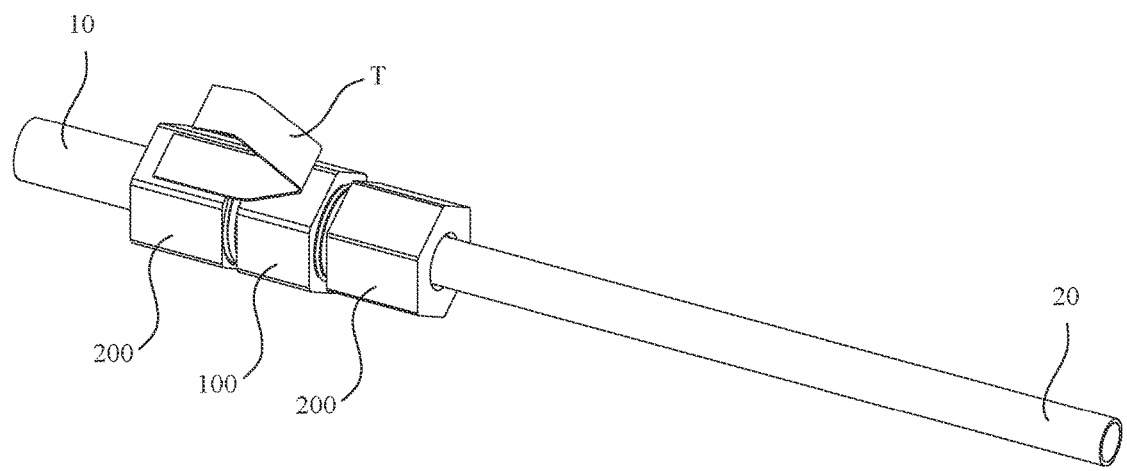
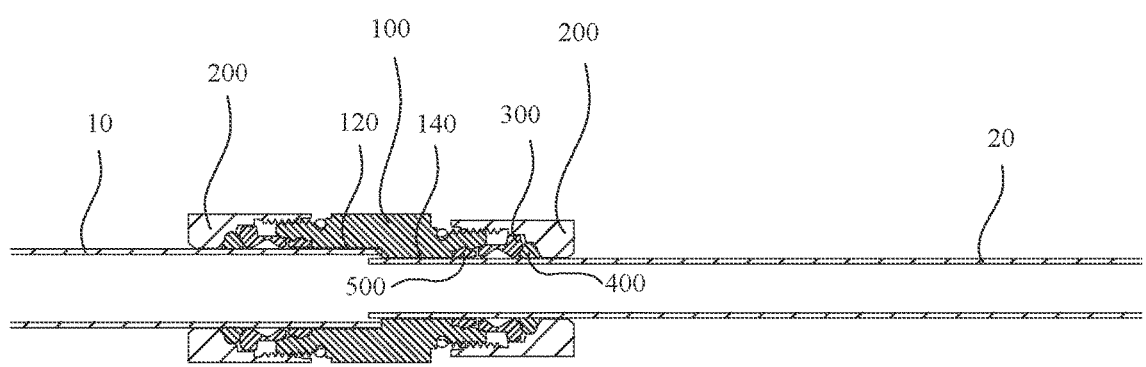

[Fig 6]
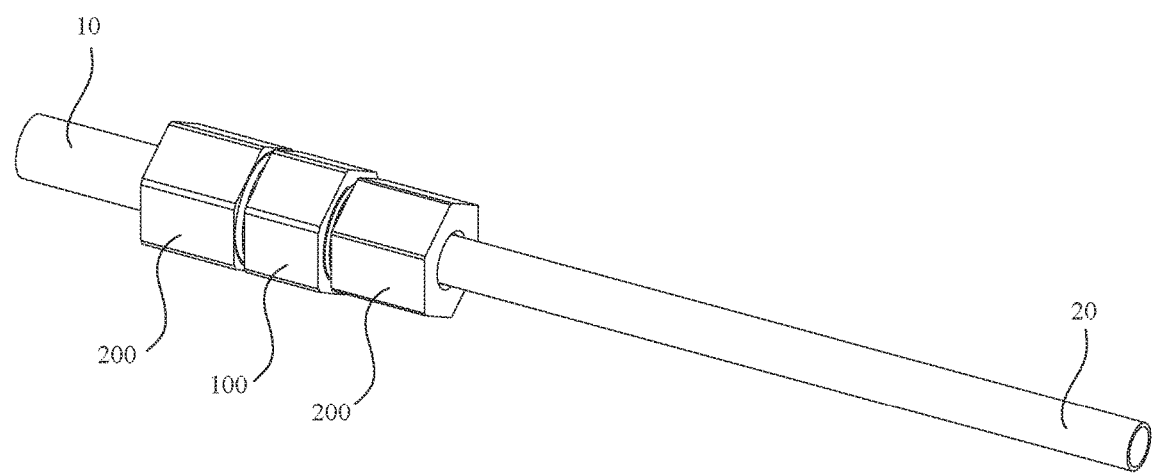
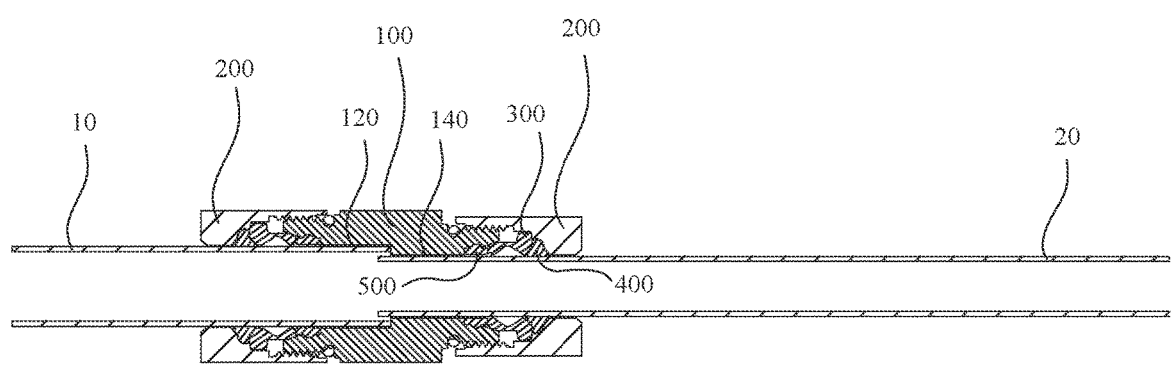

[Fig 7]
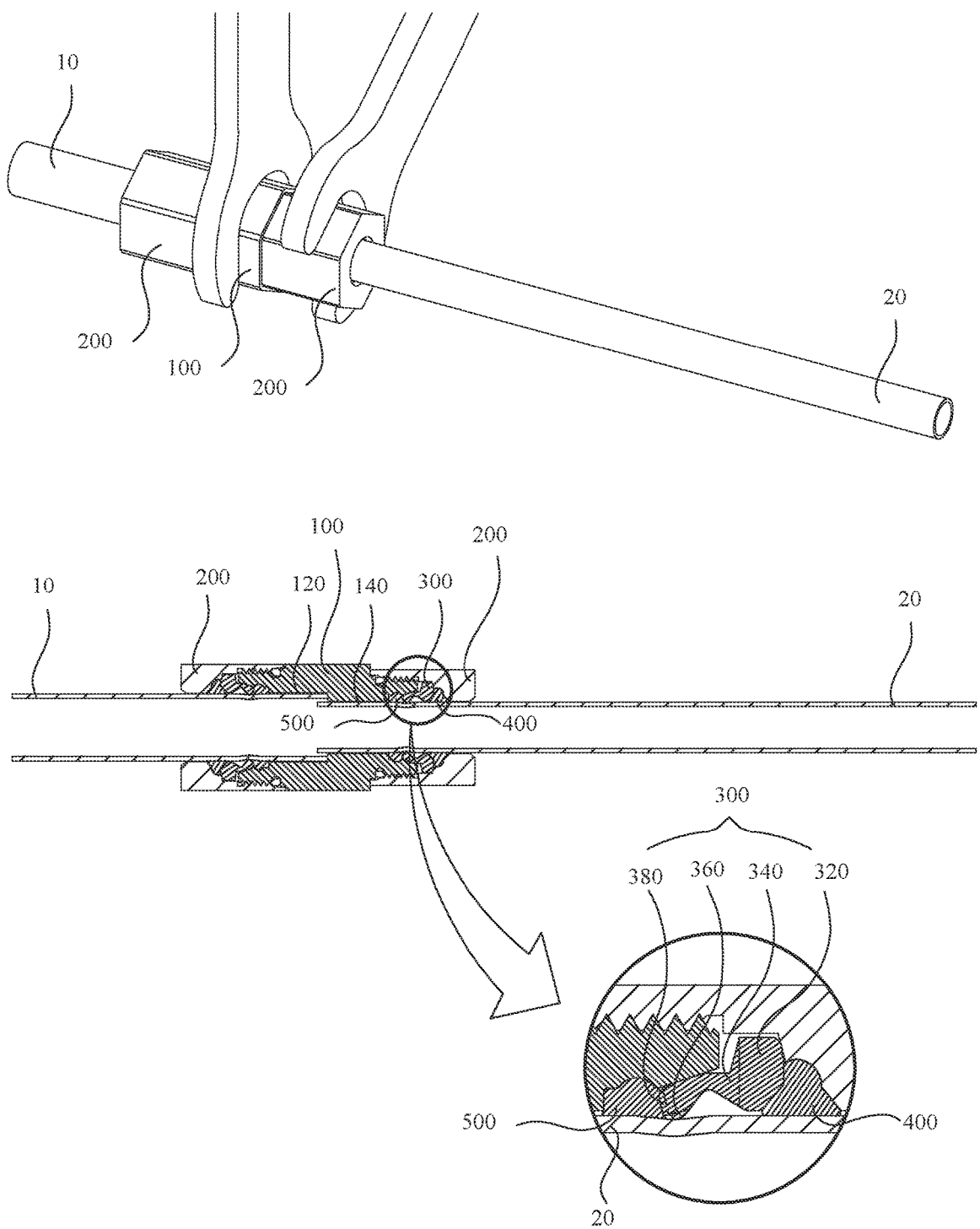

PIPE-FITTING DEVICE FOR CONNECTING PIPES HAVING DIFFERENT DIAMETERS

CROSS-REFERENCE TO RELATED APPLICATION

This Application claims the benefit of priority to Korean Patent Application No. 10-2018-0040597 filed on Apr. 6, 2018, which is incorporated by reference in its entirety.

FIELD OF THE INVENTION

The present invention relates to a pipe-fitting device capable of easily connecting pipes having different diameters, and more particularly to a pipe-fitting device capable of connecting pipes to maintain airtightness therebetween, connecting pipes having different diameters, and easily connecting pipes even when insertion lengths of the pipes are different.

BACKGROUND

Commonly, in order to connect tubes, the tubes are expanded for another tube to be inserted and are connected through welding. However, the connection of the tubes through welding requires a specialized skill of an expert and a working tool for welding. In addition, welding can cause fire hazards and require a long working time.

In order to overcome such disadvantages, a fitting device has been developed to allow tubes to be coupled by a nut. The fitting device does not require a specialized skill and various working tools. In addition, the fitting device does not need any welding, so does not cause fire hazards. Above all, the fitting device requires a short working time.

However, although the fitting device for connecting pipes can quickly connect pipes, there is a problem in that airtightness between the pipes have to be maintained after the pipes are connected.

Also, in a pipe connection, it is difficult to connect pipes that have different diameters. Also, when there is a gap between pipes or pipes overlap with each other, it is difficult to connect the pipes.

SUMMARY

The present invention is directed to providing a pipe-fitting device capable of easily connecting pipes having different diameters.

The present invention is also directed to providing a pipe-fitting device capable of easily connecting pipes even though the pipes have slightly different insertion lengths.

According to an embodiment, a pipe-fitting device capable of easily connecting pipes having different diameters includes: a fitting body comprising a first channel portion having a first inner diameter formed in a first inner side of the fitting body, a second channel portion having a second inner diameter formed in a second inner side of the fitting body, the second inner diameter being smaller than the first inner diameter such that a step is formed inside the fitting body at the boundary between the first channel portion and the second channel portion; and a pair of fixing nuts, each fixing nut rotatably coupled to a corresponding open end of the fitting body and configured to fix the corresponding one of the first pipe and the second pipe through rotational tightening.

According to an embodiment, The fitting body may include a tapered inclined surface formed inside proximate to each open end of the fitting body such that when the first pipe and the second pipe are inserted into the fitting body, a gap is formed between the fitting body and the first pipe and between the fitting body and the second pipe.

According to an embodiment, the pipe-fitting device may further include a collet inside each fixing nut, the each collet including: a mounting portion provided inside the fixing nut; a bending portion connected to the mounting portion, the bending portion comprising a bending groove formed therein, and an end portion located at an inclined gap of the fitting body such that the bending portion enters the gap to be downwardly bent when the fixing nut is tightened; a pressing portion formed at an inner surface of the collet proximate to the end portion of the bending portion to pressurize and seal a respective one of the first tube and the second tube; and a protecting portion protruding from the end portion of the bending portion to protect the pressing portion.

According to an embodiment, the pipe-fitting device may further include a fixing nut packing located inside each of the pair of fixing nuts and closely fixed to the respective one of the first tube and the second tube to prevent movement of the respective fixing nut, each fixing nut packing being in close contact with the mounting portion of the collet to prevent the collet from being pushed.

According to an embodiment, the fitting body may further include a fitting body packing installed inside each open end of the fitting body to be in close contact with each of the respective first tube and second tube, and comes into close contact with the respective protecting portion when the collet enters the gap.

According to an embodiment, an adhesive tape may be taped to outer surfaces of the fitting body and the fixing nuts and may prevent the fixing nuts from rotating so as to maintain a certain gap between the fitting body and the fixing nuts.

According to a configuration provided by the technical solution of the present invention, pipes having different diameters may be easily connected and connection may be easily performed even when pipes have slightly different insertion lengths.

A fitting body may be combined by rotation of a fixing nut and a collet installed in the fixing nut may be bent and pressurize pipes so as to seal a gap therebetween. Also, since a pressing portion of the collet which pressurizes and directly performs sealing is protected by a protecting portion, the pressing portion may be prevented from being stabbed or damaged by shock from other goods.

Also, since the pipes and the pipe-fitting device are manually rotated and temporarily fixed by using a fitting body, and a fitting body packing and a fixing nut packing which are present in the fixing nut and are tightened by using a spanner, an additional fixing device is not necessary.

BRIEF DESCRIPTION OF THE DRAWINGS

FIG. 1 is a perspective view of a pipe-fitting device capable of easily connecting pipes having different diameters according to an embodiment of the present disclosure.

FIG. 2 is an exploded perspective view of the pipe-fitting device capable of easily connecting pipes having different diameters according to an embodiment of the present disclosure.

FIG. 3 illustrates an internal configuration of the pipe-fitting device capable of easily connecting pipes having different diameters according to an embodiment of the present disclosure.

FIG. 4 is an exemplary view illustrating a first combination operation of the pipe-fitting device according to an embodiment of the present disclosure.

FIG. 5 is an exemplary view illustrating a second combination operation of the pipe-fitting device according to an embodiment of the present disclosure.

FIG. 6 is an exemplary view illustrating a third combination operation of the pipe-fitting device according to an embodiment of the present disclosure.

FIG. 7 is an exemplary view illustrating a fourth combination operation of the pipe-fitting device according to an embodiment of the present disclosure.

DETAILED DESCRIPTION

An embodiment of the present disclosure will be described as follows with reference to the attached drawings.

FIG. 1 is a perspective view of a pipe-fitting device capable of easily connecting pipes having different diameters according to an embodiment of the present disclosure.

Referring to FIG. 1, a pipe fitting device includes a fitting body 100 and a pair of fixing nuts 200. The present invention includes significant features in a first channel portion 120, a second channel portion 140, and a step which are formed in the fitting body 100.

FIG. 2 is an exploded perspective view of the pipe-fitting device capable of easily connecting pipes having different diameters according to an embodiment of the present disclosure, and FIG. 3 illustrates an internal configuration of the pipe-fitting device capable of easily connecting pipes having different diameters according to an embodiment of the present disclosure.

Referring to FIGS. 2 and 3, the fitting body 100 is a main body which connects a first pipe 10 to a second pipe 20.

The fitting body 100 has an overall cylindrical shape and has a nut-shaped middle portion for using a spanner tool to fasten the fitting body 100 to the fixing nuts 200.

According to an embodiment, male threaded portions are formed at both open ends of the fitting body 100 and are rotatably connected to corresponding female threaded portions of the fixing nuts 200.

According to an embodiment, the first channel portion 120 is formed in one inner side of the fitting body 100 and the second channel portion 140 is formed in the other inner side thereof so as to communicate with each other. According to an embodiment, the second channel 140 has a relatively smaller inner diameter than that of the first channel portion 120 such that a step is formed inside the fitting body 100 at the boundary between the first channel portion 120 and the second channel portion 140.

According to an embodiment, the first pipe 10 is inserted into the first channel portion 120 through a first open end of the fitting body 100 and comes into close contact with (or abuts) the step. The second pipe 20 is inserted into the second channel portion 140 through a second open end of the fitting body 100. According to an embodiment, the first pipe 10 has a greater diameter than that of the second pipe 20. Accordingly, the fitting body 100 includes the first channel portion 120 and the second channel portion 140 having different inner diameters due to the step so as to connect pipes having different diameters.

According to an embodiment, the first pipe 10 is inserted into the first channel portion 120, and then the second pipe 20 is inserted into the second channel portion 140 in the fitting body 100. According to an embodiment, the second pipe 20 may be partially inserted into the channel of the first pipe 10 so as to be easily combined without being influenced by an insertion length of the second pipe 20.

According to an embodiment, the fitting body 100 includes tapered inclines 160 formed inside proximate to each open end of the fitting body such that when the first pipe 10 and the second pipe 20 are inserted into the fitting body 100, a gap is formed between the fitting body 100 and the first pipe 10 and a gap is formed between the fitting body 100 and the second pipe 20. According to an embodiment, the gaps are portions in which parts of collets 300 are inserted.

The fixing nuts 200 are each rotatably fastened to the respective open end of the fitting body 100, and are each respectively tightened onto the first pipe 10 and the second pipe 20 so as to maintain airtightness therebetween.

The collets 300 are positioned in the fixing nuts 200 to pressurize the first pipe 10 and the second pipe 20 through rotational tightening of the fixing nuts 200, thereby establishing airtightness in the pipe fitting device.

The collet 300 includes a mounting portion 320, a bending portion 340, a pressing portion 360, and a protecting portion 380 and is integrally formed according to an embodiment of the present disclosure.

The collet 300 includes, in detail, the mounting portion 320; the bending portion 340 which is connected to the mounting portion 320, includes a bent groove 340 therein, and has an end located in the gap so as to enter the gap between an open end of the fitting body 100 and a corresponding one of the first pipe 10 and the second pipe 20 and be bent downward when the fixing nut 200 is tightened; the pressing portion 360 which is formed inside the end of the bending portion 340 and is capable of pressurizing the second pipe 20 for sealing; and the protecting portion 380 which protrudes from the end of the bending portion 340 and protects the pressing portion 360.

According to an embodiment, a fixing nut packing 400 may be positioned in each of the fixing nuts 200 to come into close contact with and be fixed to a respective one of the first pipe 10 and the second pipe 20 to prevent the movement. The fixing nut packing 400 comes into close contact with the mounting portion 320 of the collet 300 to prevent the collet 300 from being pushed.

According to an embodiment, fitting body packings 500 may be positioned inside each open end of the fitting body 100 and come into close contact with the respective first pipe 10 and the second pipe 20 and also come into close contact with the protecting portions 380 when the collets 300 enter the gaps.

According to an embodiment, the fixing nut packings 400 and the fitting body packings 500 are formed of rubber materials and are compressed to the pipes due to pressurization.

The protecting portion 380 is formed so as to protect the pressing portion 360 by preventing the pressing portion 360 from coming into contact with other goods. Also, since the protecting portion 380 is formed in front of the pressing portion 360 such that direct contact between the pressing portion 360 and the fitting body packing 500 may be prevented, the fitting body packing 500 may also be protected by preventing the fitting body packing 500 from being punctured.

Next, a method of using a pipe-fitting device capable of easily connecting pipes having different diameters will be described according to an embodiment of the present disclosure.

FIG. 4 is an exemplary view illustrating a first combination operation of the pipe-fitting device according to an embodiment of the present disclosure.

According to an embodiment, the fitting body 100 and the fixing nuts 200 are temporarily combined. According to an embodiment, outer surfaces of the fitting body 100 and the fixing nuts 200 are fixed using a tape T so as neither to be further tightened nor released. This is because an inner diameter of the fixing nut packing 400 therein is reduced by pressurization such that the first pipe 10 or the second pipe 20 is not inserted when the fitting body 100 and the fixing nuts 200 are too tightened. According to an embodiment, since the fixing nuts 200 combined with the fitting body 100 are movable on an outer surface of the second pipe 20, the positions of the first pipe and the second pipe may be adjusted.

Next, because the second pipe 20 has a smaller circumference than that of the first pipe 10, the second pipe 20 is inserted into the fitting body 100 combined with the fixing nuts 200 to pass therethrough and is positioned inside the first pipe 10 to slightly overlap therewith.

FIG. 5 is an exemplary view illustrating a second combination operation of the pipe-fitting device according to an embodiment of the present disclosure.

Next, referring to FIG. 5, a position may be determined by moving the fitting body 100 combined with the fixing nuts 200 toward the first pipe 10 to allow the step of the fitting body 100 to come into close contact with the engaging end of the first pipe 10. After the position is determined, the tape T is stripped.

FIG. 6 is an exemplary view illustrating a third combination operation of the pipe-fitting device according to an embodiment of the present disclosure.

Next, referring to FIG. 6, when the fixing nuts 200 combined with the fitting body 100 are manually rotated to be tightened, the fixing nut packings 400 are compressed such that the first pipe 10 and the second pipe 20 are temporarily fixed to the fixing nuts 200.

FIG. 7 is an exemplary view illustrating a fourth combination operation of the pipe-fitting device according to an embodiment of the present disclosure.

Next, referring to FIG. 7, when the fixing nuts 200 are further rotated toward the fitting body 100 to be tightened by a spanner S, the collets 300 are compressed and the bending portions 340 are deformed. The pressing portions 360 pressurize and pinch the first pipe 10 and the second pipe 20 to form airtightnesss while the protecting portions 380 compress the fitting body packings 500 such that airtightness is formed between the first pipe and the second pipe 20 due to deformation of the fitting body packings 500.

The scope of the present disclosure is not limited to the above-described specific embodiments. Various other embodiments that may be changed or modified by those skilled in the art without departing from the scope and spirit of the present disclosure defined by the appended claims fall within the scope of the present disclosure.

The invention claimed is:

1. A pipe-fitting device capable of easily connecting pipes having different diameters, comprising:

a fitting body comprising a first end portion having a first externally threaded portion, a second end portion having a second externally threaded portion, a first channel portion having a first inner diameter formed at a first depth from a first open end of the fitting body, a second channel portion having a second inner diameter formed at a second depth from a second open end of the fitting body, the second inner diameter being smaller than the first inner diameter such that a step is formed inside the fitting body at the boundary between the first channel portion and the second channel portion;

a pair of fixing; nuts, each fixing nut having an internally threaded portion for rotatably coupling said each fixing nut to a corresponding one of the first externally threaded portion and the second externally threaded portion of the fitting body and configured to fix the corresponding one of a first pipe and a second pipe through rotational tightening;

a collet in each of the pair of fixing nuts, each collet comprising:

a mounting portion provided inside the fixing nut, a bending portion connected to the mounting portion, the bending portion comprising a bending groove formed therein and an end portion located at a inclined gap of the fitting body such that the bending portion enters the gap to be downwardly bent when the fixing nut is tightened, a pressing portion formed at an inner surface of the collet proximate to the end portion of the bending portion to pressurize and seal a respective one of the first pipe and the second pipe, and a protecting portion protruding from the end portion of the bending portion to protect the pressing portion;

a first fitting body packing disposed inside the fitting body proximate to the first depth and adjacent to one of the two collets;

a second fitting body packing disposed inside the fitting body proximate to the second depth and adjacent to the other of the two collets; and a fixing nut packing located inside the each fixing nut, each of the fixing nut packing abutting the respective collet and separated from one of the first fitting body packing and the second fitting body packing by the respective each collet.

2. The pipe-fitting device of claim 1, wherein the fitting body further comprises a tapered inclined surface formed inside proximate to each open end of the fitting body such that when the first pipe and the second pipe are inserted into the fitting body, a gap is formed between the fitting body and the first pipe and between the fitting body and the second pipe.

3. The pipe-fitting device of claim 1, each fixing nut packing being in close contact with the mounting portion of the collet to prevent the collet from being pushed.

4. The pipe-fitting device of claim 1, wherein an adhesive tape is taped to outer surfaces of the fitting body and the fixing nuts and prevents the fixing nuts from rotating so as to maintain a certain gap between the fitting body and the fixing nuts.

* * * * *